United States Patent [19]
Williamson et al.

[11] Patent Number: 5,708,677
[45] Date of Patent: Jan. 13, 1998

[54] ARC VOLTAGE DISTRIBUTION SKEWNESS AS AN INDICATOR OF ELECTRODE GAP DURING VACUUM ARC REMELTING

[75] Inventors: Rodney L. Williamson, Albuquerque; Frank J. Zanner, Sandia Park, both of N. Mex.; Stephen M. Grose, Glenwood, W. Va.

[73] Assignee: Sandia Corporation, Albuquerque, N. Mex.

[21] Appl. No.: 426,545

[22] Filed: Apr. 21, 1995

[51] Int. Cl.$^6$ .................................................. H05B 7/148
[52] U.S. Cl. .......................... 373/70; 373/102; 373/105; 373/108
[58] Field of Search ................ 373/42, 47, 49, 373/50, 60, 67–70, 102, 105, 107, 108, 104

[56] References Cited

U.S. PATENT DOCUMENTS

| | | | |
|---|---|---|---|
| 3,672,428 | 6/1972 | Tommaney | 373/105 |
| 3,829,538 | 8/1974 | Darmara et al. | 373/70 |
| 4,000,361 | 12/1976 | Boondarenko et al. | 373/50 |
| 4,007,770 | 2/1977 | Timmons | 373/67 |
| 4,303,797 | 12/1981 | Roberts | 373/52 |
| 4,395,771 | 7/1983 | Medovar et al. | 373/49 |
| 4,450,570 | 5/1984 | Weingartner et al. | 373/69 |
| 4,483,008 | 11/1984 | Varrasso | 373/27 |
| 4,578,795 | 3/1986 | Fisher et al. | 373/70 |
| 4,677,643 | 6/1987 | Dicks | 373/105 |
| 4,881,239 | 11/1989 | Stenzel et al. | 373/70 |
| 4,931,702 | 6/1990 | Voronin et al. | 373/107 |
| 5,621,751 | 4/1997 | Williamson et al. | 373/70 |

*Primary Examiner*—Tu B. Hoang
*Attorney, Agent, or Firm*—George H. Libman

[57] ABSTRACT

The electrode gap of a VAR is monitored by determining the skewness of a distribution of gap voltage measurements. A decrease in skewness indicates an increase in gap and may be used to control the gap.

16 Claims, 4 Drawing Sheets

$f = 4.730 - .0792g_e - .405I$

ARC VOLTAGE DISTRIBUTION SKEWNESS AS AN INDICATOR OF ELECTRODE GAP DURING VACUUM ARC REMELTING

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to control of vacuum arc remelting operations.

2. Background Art

Vacuum arc remelting (VAR) is a process used to control the solidification of segregation-sensitive alloys. The design and techniques of VAR have evolved to appreciable levels, as described in U.S. Pat. No. 4,450,570 to Weingartner et al., and patents referenced therein. Generally described, VAR is a process whereby a cylindrically shaped, alloy electrode is loaded into a water-cooled, copper crucible of a VAR furnace, the furnace is evacuated, and a dc electrical arc is struck between the electrode (cathode) and some start material (e.g. metal chips) at the bottom of the crucible (anode). The arc heats both the start material and the electrode tip, eventually melting both. As the electrode tip is melted away, molten metal drips from it and into the molten pool beneath, and the electrode is shortened. The crucible diameter is typically somewhat larger than the electrode diameter. Consequently, the ever-shrinking electrode must be translated downwards toward the anode pool surface to keep constant the mean distance between the electrode tip and the pool. The mean distance from the electrode tip to the anode pool surface is called the electrode gap ($g_e$).

As the cooling water extracts heat from the crucible wall, the molten metal next to the wall solidifies. At some distance below the molten pool surface, the alloy becomes completely solidified, yielding a fully dense alloy ingot. After a sufficient period of time has elapsed, a steady-state situation evolves, consisting of a "bowl" of molten material situated on top of a fully solidified ingot base. As molten alloy solidifies, the ingot grows. The process, performed properly, produces ingots of high homogeneity.

Presently, VAR is the most commonly used melting process used to produce ingots for many wrought alloy applications. VAR is particularly well-suited to melting nickel-based "superalloys" (such as Alloy 718) which contain substantial quantities of reactive elements, because melting is performed in a vacuum and the solidification environment can be controlled to the optimum. Among other things, the following improvements in VAR-produced ingots have been noted: (1) contained gases, especially hydrogen and oxygen, are reduced; (2) the alloy is cleaner (fewer non-metallic inclusions); (3) center porosity and segregation in the ingot are greatly reduced; and (4) mechanical properties of the remelted alloy, such as ductility and fatigue strength, are improved.

An important VAR process control parameter is electrode gap. Excessively wide gaps, especially, can cause poor VAR performance, resulting in ingots of reduced quality. Conventional modern VAR controllers use drip-short frequency ($f_{DS}$) to control the width of the electrode gap. According to this method, as molten metal drips from the electrode surface, the hanging drop occasionally comes in contact with the anode pool before breaking away from the electrode. This causes the arc to momentarily "short", giving rise to a characteristic signature in the arc voltage trace. The number of these events that occur per second, $f_{DS}$, is a function of $g_e$, and this frequency data can be used to monitor and control the gap.

The VAR process is complex and there is no known gap control method that is foolproof. Even with the use of drip-short frequency data to control $g_e$, the electrode gap size may increase undetected. The phenomenon, not infrequently encountered, involves an increase in the size of the gap, undetected and uncorrected, until it is undesirably large during the melting process. The background art does not appear to include any reliable, non-intrusive, real-time methods for checking on VAR furnace gap control systems to determine whether they are properly functioning. Thus, a need remains for a nonintrusive method of checking, independently of drip-short frequency data, whether the electrode gap has exceeded a certain value during VAR.

SUMMARY OF THE INVENTION (DISCLOSURE OF THE INVENTION)

The present invention is of an apparatus and method for controlling electrode gap width in a vacuum arc remelting furnace, comprising: calculating an arc voltage distribution skewness of a direct current formed by the furnace; and providing the skewness to an electrode gap controller of the furnace. In the preferred embodiment, the calculating and providing actions are performed repeatedly, with the providing action being performed, most preferably, at least approximately every 10 seconds. The calculating action preferably involves acquiring voltage data at a rate greater than twice a voltage ripple frequency of 360 Hz. The electrode gap width may be estimated from the skewness and the skewness may be provided to a display device viewable by a furnace operator. The electrode gap width is preferably adjusted based upon skewness according to the following formula:

$$v(t+\tau) = v_o(t+\tau) + \frac{v}{2}\{\text{sign}[g_e^o - g_e(t)]\}$$

where $$v_o(t+\tau) = v_o(t) + \gamma \upsilon \{\text{sign}[g_e^o - g_e(t)]\}$$

and $v_o$ is a base feed velocity, $v$ is an electrode feed (ram) velocity, $g_e^o$ is a set-point electrode gap, $\gamma$ is a gain, $\upsilon$ is a maximum allowable velocity change, $t$ is time, and $\tau$ is a time increment between velocity adjustments.

A primary object of the present invention is to provide a method of controlling vacuum arc remelts which responds to anomalies more effectively than conventional drip-short frequency based electrode gap controllers.

A primary advantage of the present invention is that it may be used either to replace control by drip-short frequency or to supplement such control.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
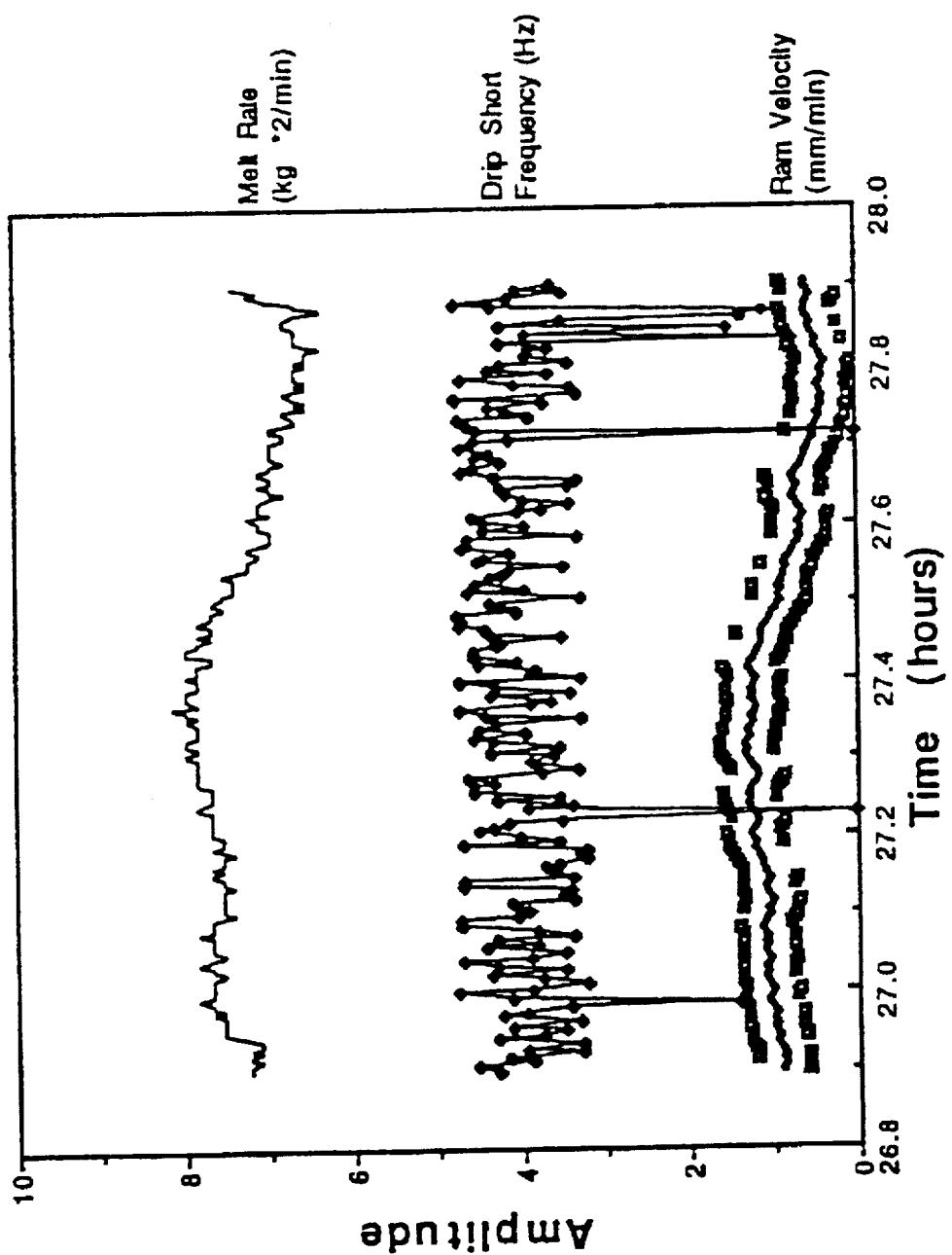
FIG. 1 is a graph showing drip-short frequency, melt rate, and ram velocity for a VAR melt during an electrode gap anomaly.

DESCRIPTION OF THE PREFERRED EMBODIMENT (BEST MODE FOR CARRYING OUT THE INVENTION)

Vacuum arc remelting is a melting and solidification process used to produce high quality ingots of chemically reactive or segregation sensitive alloys. The alloy is cast or forged into an electrode, and then remelted and solidified in a vacuum. A sustained high (several kiloamperes) direct current is used to induce an electrical arc between the electrode and a (normally water-cooled) conductive container or "crucible." Energy from the electrical arc melts the electrode (which, as mentioned, is cast from the alloy to be remelted) into the crucible. Thus, the dripping of molten electrode produces a pool of melted metal in the crucible. As the cooling water extracts heat from the crucible wall, the molten metal next to the wall solidifies. At a distance below the surface of the molten pool, the alloy becomes completely solidified, yielding a fully dense alloy ingot. After a sufficient period of time has elapsed, a steady-state situation evolves, consisting of a "bowl" of molten material situated on top of a fully solidified ingot base. As molten alloy solidifies, the solid ingot grows.

The success of the VAR process depends on, among other things, its ability to continually supply the advancing solidification region of the ingot with liquid metal while minimizing the local solidification time. If the solidification time becomes long—due to, e.g., a deep anode pool, resulting in a relatively low longitudinal thermal gradient—alloying elements will have time to segregate near the ingot center and the probability of undesirable macrosegregation will increase. Hence, it is necessary to control pool depth in segregation sensitive alloys. Considerations of process efficiency, however, recommend the maximization of the melt rate. Melt rate is maximized by manipulating arc current (the higher the current, the higher the melt rate). But high melt rates promote the formation of deeper molten alloy pools. Hence, the upper limit of melt rate is set by the segregation sensitivity of the alloy being processed.

A very important VAR process control parameter is electrode gap. If $g_e$ becomes too large, the arc may find less resistive paths to ground, such as arcing directly to the crucible wall from the lateral electrode surface. Such arcing significantly reduces process efficiency, since a smaller percentage of the current contributes to the melting of metal at the electrode tip and to the heating of the ingot. Large $g_e$ also contributes to arc constriction, i.e., attachment of the arc to a small region of the electrode tip. Arc constriction results in uneven melting of the tip and uneven heat input into the ingot, which in turn leads to a distortion of the symmetry of the solidification front. Distortions in the symmetry of the solidification front often produce solidification defects in the ingot. VAR arcs are often observed to switch back and forth between these two modes of operation when the gap is too large. Hence, it is important to precisely control $g_e$, such that melting and solidification conditions achieve and maintain a steady state with the arc evenly distributed across the electrode tip.

Modern VAR controllers commonly use drip-short frequency to regulate the electrode gap width. As melted metal drips from the electrode tip, the hanging molten drop sometimes contacts the anode pool surface before separating from the electrode. This contact causes the arc to momentarily "short", giving rise to a characteristic signature in the arc voltage trace. The number of these events that occur per second, $f_{DS}$, is a function of $g_e$. If a sufficient number of events (~100) are counted to give a statistically meaningful average value, $f_{DS}$ may be used as a control parameter to accurately predict and adjust electrode gap.

The dc electrical arc lies at the heart of the VAR process. Energy from the metal vapor arc plasma heats and melts the electrode tip, and heats the ingot surface, causing it to be molten. Thus, the temporal and spatial characteristics of the arc determine how heat and current are distributed across the electrode tip and molten ingot surface, determining the solidification behavior in the ingot and, consequently, the micro- and macro- structural properties of the alloy being processed. Present VAR control systems neither monitor nor attempt to manipulate the properties and character of the arc plasma.

Figure 2:
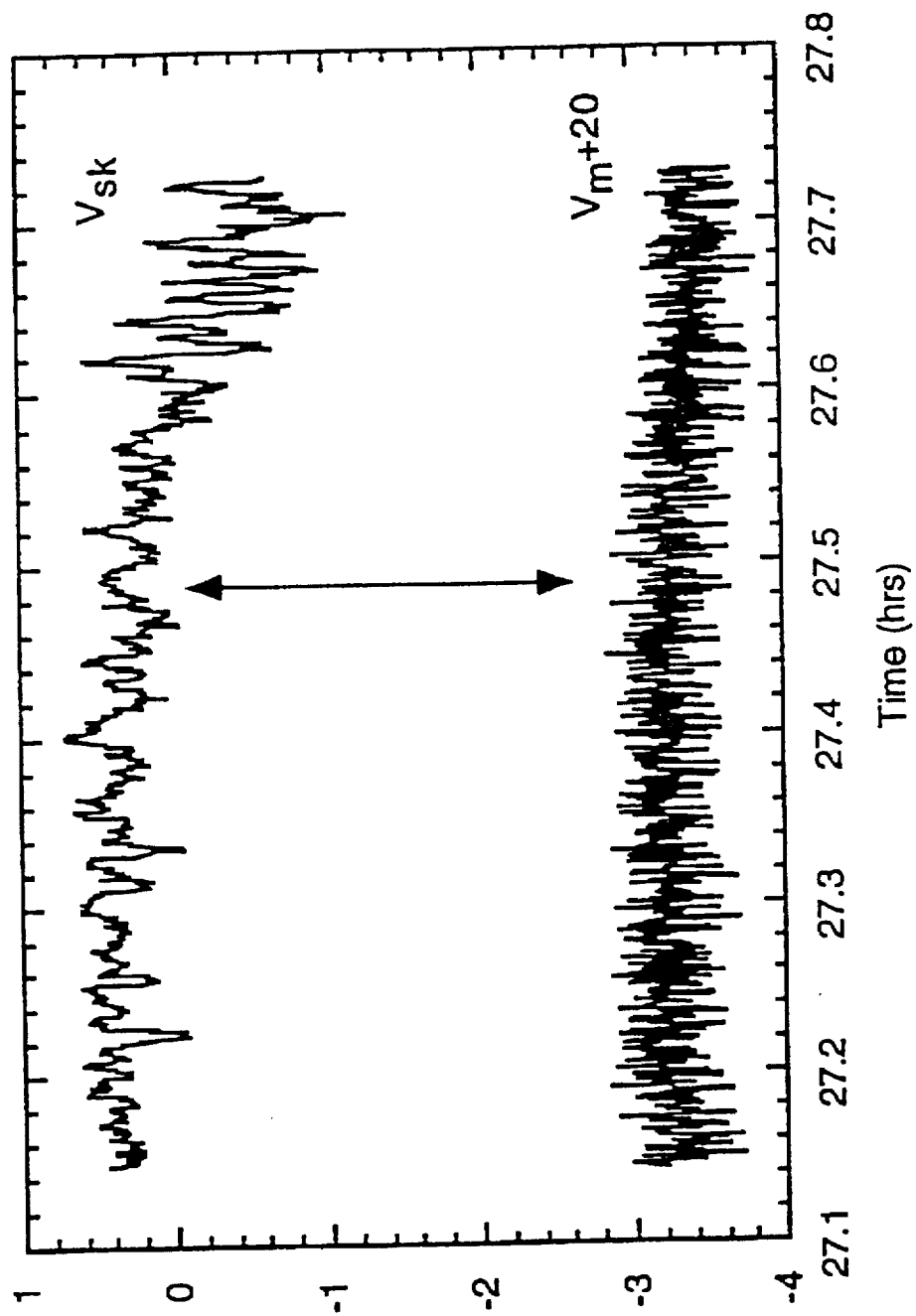
FIG. 2 is a graph of arc voltage skewness and arc voltage mean for the VAR of FIG. 2.

Because of the nature of the process, there is always an arc voltage associated with VAR. As discussed above, drip-short signatures are superimposed on the arc voltage. Typically, the arc voltage is monitored during a VAR heat, recorded on a strip chart, and archived for future reference. The reason for this is that arc voltage is considered to be an indicator of the status of the VAR process. Voltage excursions indicate that the process is deviating from normal. Unfortunately, the origin of many voltage excursions are not completely understood and deviations occur that are not indicated in the arc voltage record. For example, the lower trace of FIG. 2 shows arc voltage data acquired during a gap-opening event discussed below: only a relatively small change in the trace is evident. Although arc voltage is used as an electrode gap control response during high current (>20 kA) VAR, at the low melting currents used for segregation sensitive alloys (<10 kA), it is not a sensitive indicator.

If one examines the arc voltage as a function of time, the points form a voltage distribution. One of the properties of this distribution is the mean, or average, voltage. This constitutes the $1^{st}$ moment of the distribution and is calculated from the formula:

$$\mu = \frac{1}{n} \sum_{i=1}^{n} v_i$$

This is the property of the voltage distribution that has traditionally been used as a measure of the status of the VAR process. The averaging process may or may not be carried out explicitly. For example, if the data is recorded on a strip chart, the time constant of the strip chart input performs the averaging in real time. However, there are other properties of the voltage distribution that may be relevant. One such property is the standard deviation of the distribution, $\sigma$, which is associated with the $2^{nd}$ moment of the distribution and is a measure of its width. Another is the skewness of the distribution and is a measure of the symmetry of the distribution about its mean. This property is associated with the $3^{rd}$ moment of the distribution and is given by:

$$\zeta = \frac{1}{n\sigma^3} \sum_{i=1}^{n} (v_i - \mu)^3$$

If the distribution is symmetric about its mean, e.g., a normal or Gaussian distribution, then the skewness will be identically zero.

The present invention notes that the skewness of the arc voltage distribution is an indicator of electrode gap during VAR. A plot of the arc voltage skewness as a function of electrode gap and melting current during VAR of Alloy 718 in an industrial furnace shows that as the electrode gap increases, the skewness linearly decreases, undergoing a sign change from positive to negative. This appears to be a universal characteristic of VAR arc voltage during low current melting conditions, the zero crossing point coming at progressively smaller gaps as melting current is increased.

Data from a VAR operation at an industrial facility is illustrated in FIG. 1, where the upper trace shows melt rate, the middle trace shows drip short frequency, and the lower trace shows instantaneous (points) and average (solid line) ram velocity. Note that the ram velocity decreases with a concomitant decrease in melt rate, but with no change in drip-short frequency. The gap increased during this time. If one examines the arc voltage skewness for this heat during the time period when the anomaly occurred, the results plotted in FIG. 2 are obtained. Note that the arc voltage skewness (upper trace) remains approximately constant initially, but turns down sharply at the point marked by the arrow. This point marks the time at which the electrode gap began to open undetected by the drip-short based gap controller. Hence, had the controller had the ability to acquire and analyze arc voltage distribution skewness, the anomaly would have been detected and the controller could have reacted. FIG. 2 also shows the arc voltage during this time, which, as pointed out above, is not particularly sensitive to the gap opening event.

The present invention uses conventional data acquisition techniques to acquire arc voltage during VAR furnace operation and calculate the skewness of the distribution. It then applies this distribution property (skewness) either as a check on an electrode gap controller or, if applicable, as the primary response input to the electrode gap controller.

Data acquisition may be accomplished using existing computer technology. For example, the arc voltage data used to derive the results shown in FIG. 2 were acquired using a small PC-type computer equipped with a commercially available plug-in data acquisition card. The data acquisition rate was 10 kHz. The primary requirement on the acquisition rate is that the system be capable of acquiring data at a rate greater than twice the voltage ripple frequency of 360 Hz. This is necessary to avoid aliasing.

Data analysis is easily accomplished using the same computer that acquires the data. The computer performs n acquisitions at the specified rate, computes the skewness property, passes the value to the control system, and then repeats the process. The results shown in FIG. 2 were derived by acquiring n=10,000 points at the rate specified above. The duty cycle for this operation was about 50%, i.e., the result of a one second average was presented every other second. Duty cycle may be improved by acquiring fewer points from which to calculate the distribution properties or by using a faster computer. The important thing is that a result he presented to the controller at a sufficient rate to enable relevant control decisions to be made. For VAR, an output every 10–30 seconds or so is usually more than sufficient.

The voltage skewness data may be incorporated any number of ways into existing control systems as a check. For example, the simplest scheme would involve recording the output on the strip chart along with the voltage, current, melt rate, etc., that are typically recorded as standard melt shop practice, and at the same time having the output displayed in real time on the operator's console. This method would allow the operator to know when a melt anomaly was in progress and take corrective action, as well as keep a running record of voltage skewness for future reference. A second more complicated scheme would involve feeding the voltage skewness data directly into the controller and programming the controller to acquire and respond to the information. For example, the controller could be programmed to lock the ram velocity during a melting anomaly until the voltage skewness returned to normal. Many checking schemes could be devised and implemented using the programmable logic controllers found in most modern industrial VAR shops.

Figure 3:
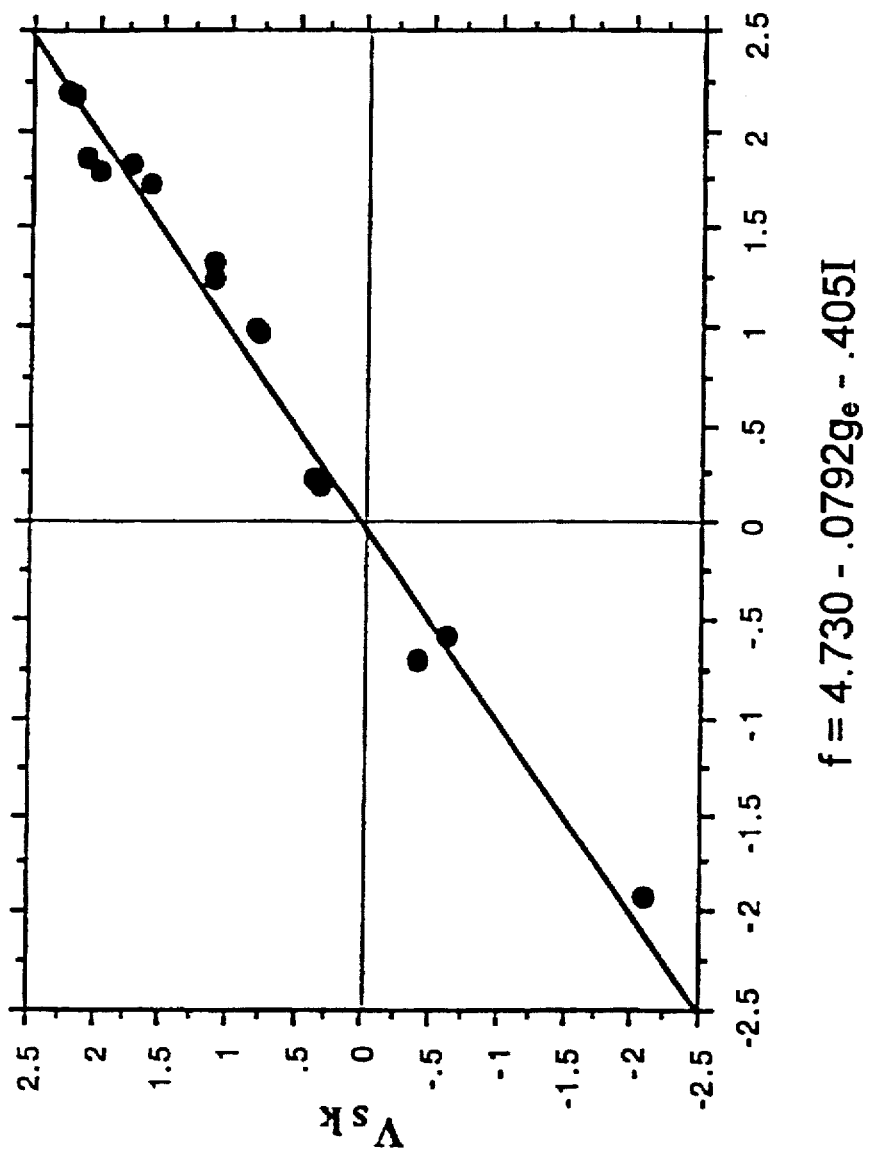
FIG. 3 shows a plot of averaged arc voltage skewness as a linear function of electrode gap and melting current.

As demonstrated above, the arc voltage skewness may by sufficiently well modeled that it may be used as an electrode gap predictor for control purposes. In such a case, the computer would be required to take one further step and calculate a value for the electrode gap from the arc voltage skewness result. For example, the model plotted in FIG. 3 from measured data yields the following relation between electrode gap and arc voltage skewness:

$$V_{SK} = 4.730 - 0.07918 \, g_e - 0.4045 \, I \pm 0.18$$

The square of the coefficient of determination for this model is 0.98. Given the melting current, this equation may be solved to yield an accurate approximation to the electrode gap, and this value may then be used directly by the computer to adjust ram velocity according to a suitable algorithm, or be fed from the computer into an existing programmable logic controller and incorporated into an existing control scheme.

It is important that a control system be sufficiently robust, i.e., that it not over-respond to fluctuations in the measured gap. In any system of this type, a certain level of noise in the measurements is to be expected. By the statistical nature of noise, random fluctuations in a measured property define a distribution of possible values (e.g., a Gaussian or bell-shaped distribution). Though most measured values fall in the vicinity of the mean, a certain probability exists for significantly larger fluctuations. A control system should not respond to such fluctuations in a proportional manner. To meet this requirement, it is preferred to use an adaptive bang-bang algorithm to make changes to electrode feed velocity in the voltage skewness based control system of the invention. This algorithm has the form:

$$v(t+\tau) = v_o(t+\tau) + \frac{\upsilon}{2} \{\text{sign}[g_e^o - g_e(t)]\}$$

where $$v_o(t+\tau) = v_o(t) + \gamma \upsilon \{\text{sign}[g_e^o - g_e(t)]\}$$

and $v_o$ is the base feed velocity, v is the electrode feed (ram) velocity, $g_e^o$ is the set-point electrode gap, $\gamma$ is the gain, $\upsilon$ is the maximum allowable velocity change, t is time, and $\tau$ is the time increment between velocity adjustments. Note that $v_o$ is estimated and entered in by the operator, but that as time passes this base velocity is "adapted" by the controller. Obviously, other robust control methods may also be applied to this problem. For example, the present invention may be incorporated into a PID controller.

Figure 4:
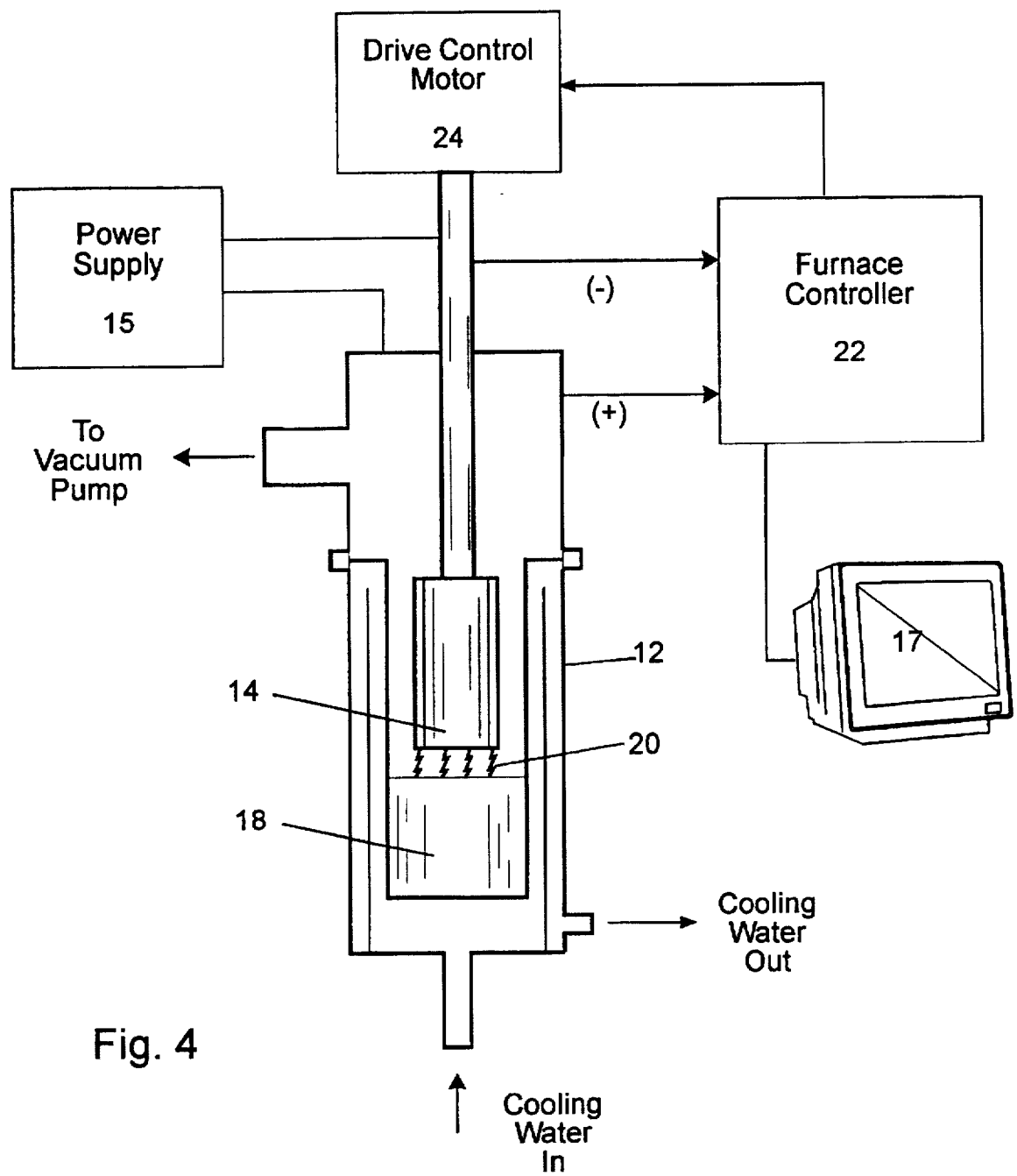
FIG. 4 illustrates the preferred apparatus of the invention.

FIG. 4 illustrates the preferred control apparatus of the invention attached to vacuum arc remelt furnace 10. Furnace 10 comprises chamber 12 that encloses electrode 14, and a water-cooled copper mold or crucible 16 in which melting and solidification of ingot 18 occurs. Conventional direct current source 15 is used for inducing an electric arc 20 between electrode 14 and mold 16. Controller 22, which preferably comprises computer data acquisition and analysis technology, such as a monitor 17, samples for electrical characteristics of the direct current circuit and, by employing the methods described above, make appropriate adjustments to inputs to the furnace motor controller 24.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for controlling electrode gap width in a vacuum arc remelting furnace having an electrode spaced across an adjustable gap from an electrically conductive surface, and a direct current power source causing an electric arc across the gap, an electrode gap voltage being formed between the electrode and the surface, the method comprising the steps of:

a) determining an arc voltage distribution skewness of the electrode gap voltage; and
   b) controlling the gap based on changes in the skewness.

2. The method of claim 1 wherein step a) comprises:

making n measurements of electrode gap voltage over a period of time;
   determining the mean, $\mu$, and standard deviation, $\sigma$, of the n voltage measurements; and
   calculating skewness, $$s = \frac{1}{n\sigma^3} \sum_{i=1}^{n} (v_i - \mu)^3.$$

3. The method of claim 2 wherein the controlling step b) is performed at least approximately every 10 seconds.

4. The method of claim 2 wherein the n measurements of voltage data are acquired at a rate greater than twice a voltage ripple frequency of 360 Hz.

5. The method of claim 1 additionally comprising the step of determining an approximate value of the electrode gap width from the skewness.

6. The method of claim 1 wherein the controlling step b) comprises providing the skewness to a display device viewable by a furnace operator.

7. The method of claim 1 additionally comprising the step of adjusting the electrode gap width based upon the skewness.

8. The method of claim 7 wherein the adjusting step comprises altering an electrode feed velocity according to the following formula:

$$v(t+\tau) = v_o(t+\tau) + \frac{v}{2} \{\text{sign}[g_e^o - g_e(t)]\}$$

where $$v_o(t+\tau) = v_o(t) + \gamma v \{\text{sign}[g_e^o - g_e(t)]\}$$

and $v_o$ is a base feed velocity, v is an electrode feed (ram) velocity, $g_e^o$ is a set-point electrode gap, $g_e(t)$ is the electrode gap, $\gamma$ is a gain, $\upsilon$ is a maximum allowable velocity change, t is time, and $\tau$ is a time increment between velocity adjustments.

9. An apparatus for controlling electrode gap width in a vacuum arc remelting furnace having an electrode spaced across an adjustable gap from an electrically conductive surface, and a direct current power source causing an electric arc across the gap, an electrode gap voltage being formed between the electrode and the surface, the apparatus comprising:

means for determining an arc voltage distribution skewness of the electrode gap voltage; and
   means for controlling the gap based on changes in the skewness.

10. The apparatus of claim 9 wherein said determining means comprises: comprises:

means for making n measurements of electrode gap voltage over a period of time;
   means for determining the mean, $\mu$, and standard deviation, $\sigma$, of the n voltage measurements; and
   means for calculating skewness, $$s = \frac{1}{n\sigma^3} \sum_{i=1}^{n} (v_i - \mu)^3.$$

11. The apparatus of claim 10 wherein said controlling means operates at least every 10 seconds.

12. The apparatus of claim 10 wherein the n measurements of voltage data are acquired at a rate greater than twice a voltage ripple frequency of 360 Hz.

13. The apparatus of claim 9 additionally comprising means for determining an approximate value of the electrode gap width from said skewness.

14. The apparatus of claim 9 wherein said controlling means comprises means for providing said skewness to a display device viewable by a furnace operator.

15. The apparatus of claim 9 additionally comprising means for adjusting the electrode gap width based upon the skewness.

16. The apparatus of claim 15 wherein said adjusting means comprises means for altering an electrode feed velocity according to the following formula:

$$v(t+\tau) = v_o(t+\tau) + \frac{v}{2} \{\text{sign}[g_e^o - g_e(t)]\}$$

where $$v_o(t+\tau) = v_o(t) + \gamma v \{\text{sign}[g_e^o - g_e(t)]\}$$

and $v_o$ is a base feed velocity, v is an electrode feed (ram) velocity, $g_e^o$ is a set-point electrode gap, $g_e(t)$ is the electrode gap, $\gamma$ is a gain, $\upsilon$ is a maximum allowable velocity change, t is time, and $\tau$ is a time increment between velocity adjustments.

* * * * *